United States Patent [19]

Yamamichi

[11] 4,017,875
[45] Apr. 12, 1977

[54] CAMERA ALLOWING MULTIPLE EXPOSURE

[75] Inventor: Masayoshi Yamamichi, Kawasaki, Japan

[73] Assignee: Canon Kabushiki Kaisha, Tokyo, Japan

[22] Filed: Aug. 26, 1975

[21] Appl. No.: 607,914

[30] Foreign Application Priority Data

Aug. 29, 1974 Japan .................... 49-99123

[52] U.S. Cl. .................... 354/209; 354/152; 354/205
[51] Int. Cl.² .................... G03B 19/12
[58] Field of Search ........ 354/209, 214, 204, 205, 354/206, 207, 208, 153, 152

[56] References Cited

UNITED STATES PATENTS

| | | | |
|---|---|---|---|
| 3,650,191 | 3/1972 | Nomura ............ | 354/209 |
| 3,757,660 | 9/1973 | Kuramoto .......... | 354/204 |
| 3,829,876 | 8/1974 | Uno et al. ......... | 354/209 |
| 3,860,939 | 1/1975 | Uno .................. | 354/153 |
| 3,909,835 | 9/1975 | Ito et al. .......... | 354/204 |

FOREIGN PATENTS OR APPLICATIONS

| | | | |
|---|---|---|---|
| 1,147,472 | 4/1963 | Germany ........... | 354/207 |
| 2,164,355 | 12/1971 | Germany ........... | 354/209 |

*Primary Examiner*—Edna M. O'Connor
*Attorney, Agent, or Firm*—Toren, McGeady and Stanger

[57] ABSTRACT

The present invention relates to a camera having a wind up device which effects shutter charge and film advancing operation simultaneously by a conventionally known wind up lever and a rewinding device, having the capability to be changed over by pressing a rewinding button from a film wind up state to a film rewinding state, wherein multiple exposure is made possible by manipulation of the rewinding button and at the same time change over from the rewinding state to the wind up state is effected in association with shutter operation.

3 Claims, 2 Drawing Figures

CAMERA ALLOWING MULTIPLE EXPOSURE

BACKGROUND OF THE INVENTION:

1. Field of the Invention:

The present invention relates to a camera allowing multiple exposure. Generally speaking, in a camera using a film housed in a magazine and having a wind up mechanism in which shutter charge and film advancing are accomplished by operating one wind up lever and a device to rewind a film after photographing into the magazine, a sprocket for film advancing is coupled with a wind up machanism through a clutch, and at the time of film wind up it is rotated by operating the wind up lever while at the time of rewinding the coupling with the wind up mechanism is released by disengaging said clutch through handling of the rewinding button so that rotation to the reverse direction can be accomplished along with shifting of film to magazine side. Since a checking member is activated in association with the pressing of the rewinding button at the time of said rewinding to check the rewinding button for retaining the released state of the clutch, a photographer does not have to keep pressing the rewinding button.

For making multiple exposures with such a conventional camera, at the same time when the rewinding button is pressed to disengage the clutch after initial exposure, the wind up lever is operated while the film is retained in its position without moving by some other means. Then the shutter only is charged, and thus if the shutter button is pressed second exposure can be done.

2. Description of Prior Art:

A multiple exposure device known from U.S. Pat. No. 3,650,191 shows that a multiple exposure button which can be linked with a rewinding button is provided to prevent shifting of film by rotation of a film take up spool at the time of shutter charge for multiple exposure, whereby a checking member is made to work on the spool at the same time as release of the clutch by pressing of said button. In this device utmost care must be exercised not to misuse the multiple exposure button and the rewinding button. Also it exhibits a shortcoming in that since the change over from the rewinding state to the wind up state is effected by releasing the checking of the rewinding button in association with the wind up mechanism, when the film end is reached during the course of a wind up operation and the wind up mechanism stops at a position at which the wind up mechanism releases the checking of the rewinding button, the checking member will not operate even if the rewinding button is pressed. Therefore a photographer must continue pressing the rewinding button during rewinding operation.

SUMMARY OF THE PRESENT INVENTION:

The present invention is directed toward eliminating shortcomings of prior art devices and toward provision of a camera wherein multiple exposure and rewinding can be accomplished by only one operating button with maintenance of the rewinding state being accomplished by only one pressing of the operating button regardless of the position at which a wind up mechanism is stopped.

Toward that end in the present invention a retaining member to retain a clutch of a sprocket at a released state and a checking member for a film take up spool are operated in association with a rewinding button and at the same time said checking is released by return action of a mirror or a diaphragm mechanism linked with shutter operation. According to the set-up of the present invention a camera can be obtained such that change over can be accomplished either to rewinding or multiple exposure conditions by handling a rewinding button, with ease of operation, and inasmuch as the wind up mechanism does not operate at all on the retaining member of the clutch, rewinding of the film can be accomplished without continuously pressing the rewinding button regardless of the position at which the wind up lever is stopped.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
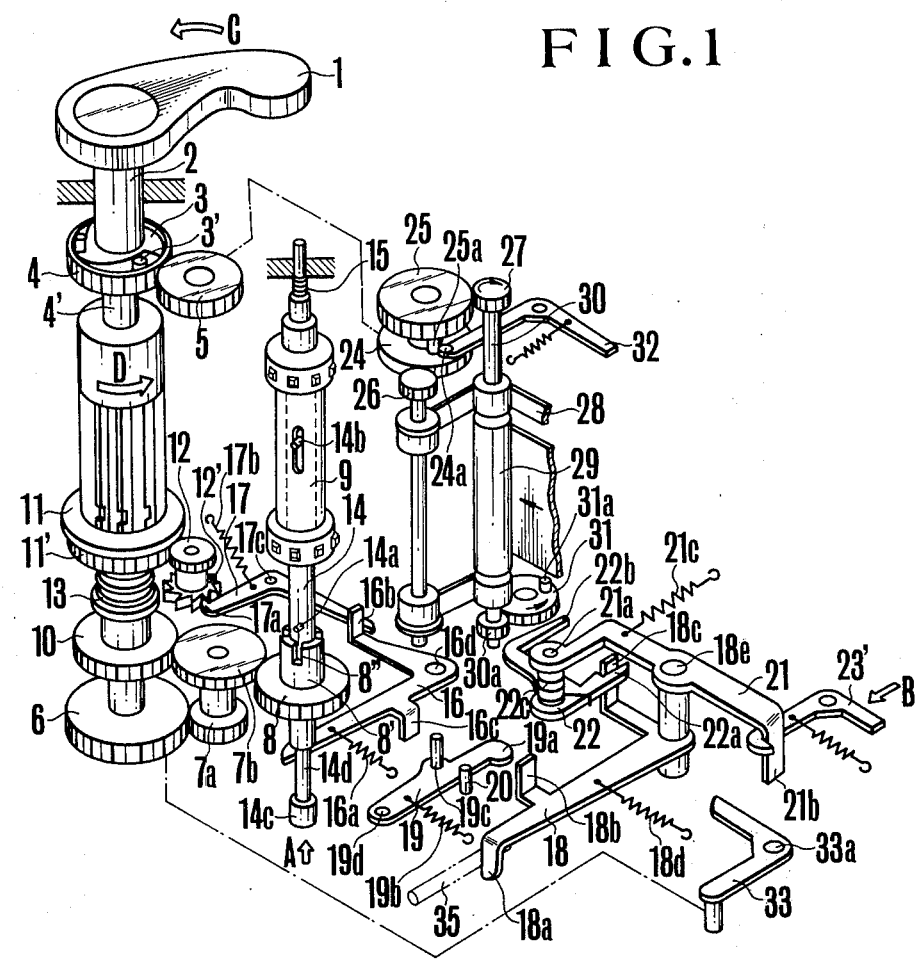
FIG. 1 is an exploded view of a camera mechanism in accordance with the invention wherein a retaining member of a clutch is linked with an automatic diaphragm mechanism.

FIG. 1 shows a wind up device at a state set for multiple exposure photography, wherein 1 is a wind up lever, 2 is a wind up lever axle arranged for reciprocal rotation integrally with lever 1, while 3 is a one way clutch claw integral with the wind up axle 2, with a gear 4 engaging the claw through a roller 3'. 4' is a wind up axle which transmits rotation of the wind up lever axle 2 and which is integral with the gear 4. The rotation of the lever 1 in the wind up direction indicated by arrow C is transmitted to a shutter charge mechanism to be described later by gears 4, 5, and it is also transmitted to a sprocket 9 through two step gears 7a, 7b by a gear 6 integrally provided at lower end of the wind up axle 4' and by a sprocket gear 8. At the same time this rotation is transmitted to a film take up spool 11 by a spool gear 10. The spool 11 has a gear part 11' integrally made therewith which engages with a gear 12 having a ratchet claw part 12'. The gear part 11' of the spool 11 is frictionally coupled with the spool gear 10 by a spring 13, and the rotation of the gear 7b is transmitted to spool 11 through the spool gear 10.

On the other hand, the sprocket 9 is coupled with an axle 14 by a pin 14b on said axle 14 in such manner as to rotate together with said axle 14 cut groove 8″ engaging with another pin 14a of the sprocket axle 14 is provided at a cylindrical part 8' of the sprocket gear 8, and thus a clutch is formed by the pin 14a and the groove 8″, and the sprocket is linked with the gear 7b through said clutch. The sprocket axle 14 can slide along the axial direction within the sprocket and a rewinding button 14c which can be operated from outside of a camera is fixedly provided at the lower end of the axle 14, and is biassed downward by a spring 15.

16 is a retaining lever for the axle 14, which is axially supported in a manner rotatable around an axle 16d and is biassed in a counter-clockwise direction by a spring 16a. When the rewinding button 14c is pressed in the direction of arrow A, lever 16 engages with a step part 14d of the sprocket axle as shown in the drawing to retain a state at which the clutch is disengaged. In this state, a riser part 16b of another arm of said lever 16 engages with a spool checking lever 17 to rotate the same around an axle 17c against a spring 17b to have a claw 17a at its forward end engage with the ratchet gear 12' of the gear 12 for blocking the rotation of the spool 11.

18 is an automatic diaphragm lever having an arm 18a engaging with an automatic diaphragm pin 35 of a photographing lens and is axially supported to be rotatable around an axle 18e, while being biassed in a counter-clockwise direction by a spring 18d. 19 is a release lever engageable with the checking lever 16, which is axially supported to be rotatable around an axle 19d, and biassed by a spring 19b with its rotation being stopped as it comes in contact with a stopper 20.

21 is a charging lever rotatable around an axle of the automatic diaphragm lever 18 in a coaxial manner, and when a charge lever 33 rotates in a clockwise direction around an axle 33a in association with operation of the wind up lever 1, an arm 21b is pushed by said lever 33 and is rotated in the counter-clockwise direction, charging the diaphragm driving spring 21c, and checked by a checking lever 23. A checking lever 22 is rotatably supported at the axle 21a provided at another arm of the lever 21, and the forward end 22a of the lever engages with one arm 18c of the above mentioned automatic diaphragm lever 18 being biassed by a spring 22c, while the lever 21 and the lever 18 are coupled together through the lever 22.

24 is a leading screen master gear of a conventionally known type of focal plane shutter and 25 is a follower screen master gear. When the leading screen master gear 24 is rotated by operation of the wind up lever through the gears 4, 5, the pins 24a, 25a engage with each other and both gears 24, 25 rotate together, driving a leading screen 28, a follower screen 29 in the direction of the arrow through pinions 26, 27 which engage with said both gears respectively. At the same time, a shutter driving spring not shown in the drawing is charged. A gear 30a is fixedly provided at the lower end of a follower screen pinion axle 30, and engages with a shutter operation completion signal gear 31. A pin 31a which is to engage with one arm 22b of the above mentioned checking lever 22 extends from the gear 31. 32 is a leading screen checking lever which engages with a pin 24a.

In the operation of the mechanism described above, when initial photography is completed on a film plane on which multiple exposure photography is to be effected, a rewinding button 14c of the sprocket axle 14 is pushed up to a direction of arrow A. As a result, the retaining lever 16 engages with the step part 14d of the sprocket axle 14 by the action of the spring 16a, and the sprocket axle 14 is retained against the descending force of the spring 15, while the pin 14a disengages itself from the cut groove 8" of the cylindrical part 8' of the sprocket gear 8 so that the rotation of the sprocket gear 8 will not be transmitted to the sprocket 9. As the riser part 16b of the retaining lever 16 releases the checking of the spool checking lever 17, the claw 17a checks the claw part 12' by the spring 17b to place the gear 12 in an inoperable state. Since the gear part 11' is thus placed in a locked state, the spool 11 becomes unable to rotate. Upon wind up with the mechanism in this state charging of the gears 24, 25 of the shutter mechanism is effected through the gears 4, 5 when the wind up lever 1 in the direction of arrow C. But since the film feeding mechanism is in the condition described above the rotation of the gear 6 will not be transmitted to the sprocket 9 despite the fact that it is transmitted to the sprocket gear 8 through the gears 7a, 7b. On the other hand, at the spool 11, while the rotation of the gear 6 is transmitted to the spool gear 10 through the gears 7a, 7b, since the claw part 12' is checked against rotation the frictional coupling between the end face of the gear part 11' of the spool and the gear 10 slips without transmitting the rotation. Therefore the film is stopped at the position of the above mentioned operating state and shutter charging only will be effected. However, the charging of the automatic diaphragm mechanism is accomplished each time by the automatic diaphragm charge lever 33 in an association with the wind action of the wind up lever 1 irrespective of the multiple exposure operating state of the camera. Upon completion of wind up the checking lever 23 rotates in the direction of arrow B by release of the shutter button not shown in the drawing, and the checking of the automatic diaphragm charge lever 21 is released and the lever is rotated in a clockwise direction by the spring 21c. At this time, the two arm checking lever 22 also rotates in the same direction while checking 18c, thereby rotating the automatic diaphragm pin 35 of the photographing lens by the automatic diaphragm lever 18 to stop down the same to a prescribed diaphragm aperture value. As the forward end part 19a of the above mentioned release lever 19 is pressed by the riser part 8b against the force of spring 19b, near the position at which the stop down of the automatic diaphragm lever 18 is completed, the lever 19 is rotated in a counter clockwise direction. The lever 19 thus rotates the checking lever 16 in a clockwise direction by engagement therewith of the pin 19c at its other end.

Since the forward end of the retaining lever 16 is disengaged from the step part 14d of the sprocket axle 14 by the rotation of said lever 16 in a clockwise direction, the sprocket axle 14 is pushed downward by the spring 15 and the pin 14a engages with the cut groove 8" of the cylindrical part 8' of the sprocket gear 8. On the other hand, the riser part 16b at the other end of the retaining lever 16 rotates the spool checking lever 17 in a counter-clockwise direction against the spring 17b to disengage the same from the claw part 12'. By the stop down operation of the above mentioned automatic diaphragm the linked relationship between the sprocket 9 and the spool 11 is resumed and the mechanism of the film feeding mechanism returns to its ordinary operating state.

Further, the function of a camera is such that the leading screen checking lever 32 of the shutter is released by a conventionally known method in line with completion of stop down of the automatic diaphragm mechanism to start the leading screen and to run the follower screen at a prescribed shutter time in order to complete photographing. The running of the follower screen rotates the gear 31 in the direction the arrow through the gear 30a of the follower screen pinion axle 30, and one end part 22b of the above mentioned two arm checking lever 22 is rotated in a clockwise direction against the spring 22c at the position at which the running of the follower screen is completed by the pin 31a. As a result the claw part 22a releases the riser part 18c of the automatic diaphragm lever 18, and the automatic diaphragm lever 18 is rotated in a conunter-clockwise direction by the spring 18d.

Due to rotation of the automatic diaphragm lever 18, the automatic diaphragm pin 35 of photographing lens returns to the release side and the aperture of the photographing lens returns to the fully opened state. This is the so-called automatic diaphragm mechanism. At this time, the release lever 19 stops at the position of the stopper pin 20 to which it is urged by the spring 19b.

By the above action, the multiple exposure photographing is completed and the camera returns to its next ordinary photographing state. Also at the time of another multiple exposure operation, if the rewinding button 14c is pushed up again the operation described above will be repeated.

Figure 2:
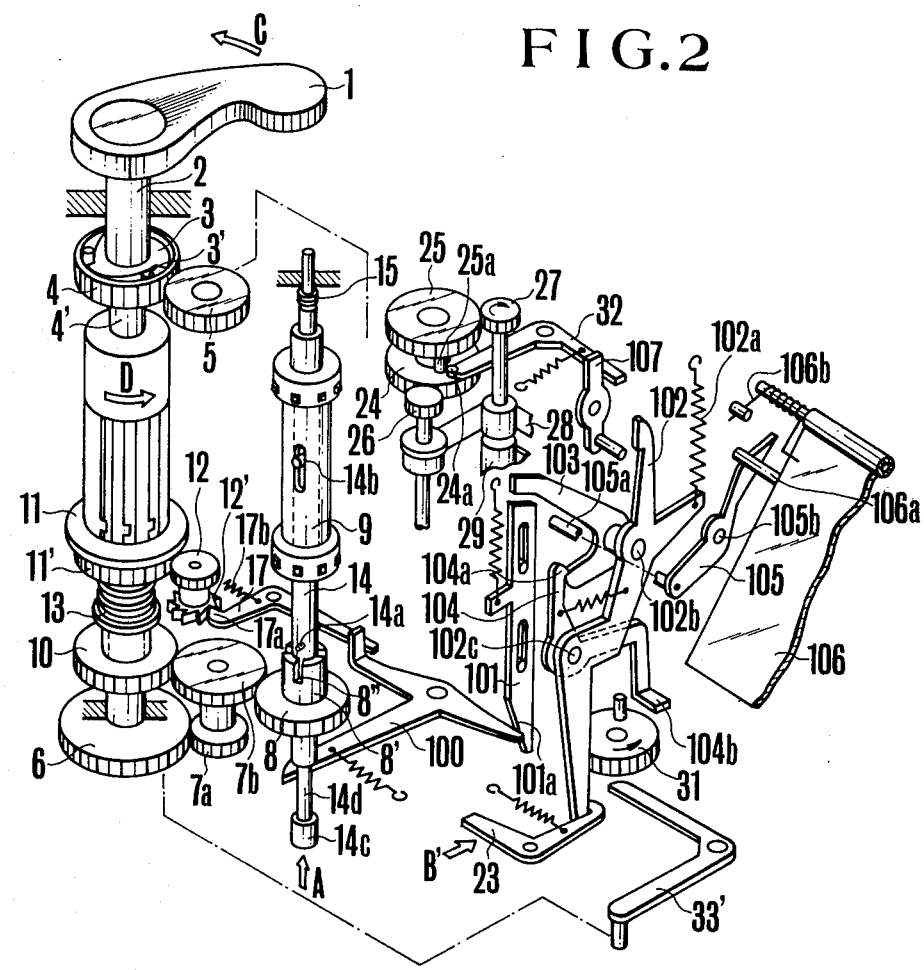
FIG. 2 is an exploded view of a second embodiment wherein the retaining member of the clutch is linked with a reflex mirror.

While the release of multiple exposure condition is effected by automatic diaphragm mechanism in the above example, an embodiment wherein release of multiple exposure photographing condition is effected by a mirror up and down mechanism will be explained to FIG. 2. In FIG. 2, similar parts as in FIG. 1 are identified with similar reference characters and detailed explanations thereof will be omitted. 100 is a retaining lever corresponding to the above mentioned lever 16, and hving a three arm fork shape, and with one end thereof engaging the step part 14d of the sprocket axle 14, while the riser part engages with the spool checking lever 17, and with the other end engaging a slanted part 101a of a mirror up and down signal slider 101. 102 is a mirror driving lever with a jump up lever 103 being axially supported at the axle thereof coaxially. Also a mirror checking claw 104 is axially supported at the axle 102c provided at one arm of the mirror driving lever 102, and this checking claw 104 has a hook part 104a engaging with the claw part of the jump up lever 103. The above mentioned mirror driving lever 102 is rotatingly biassed in a counter-clockwise direction by the spring 102a. The forward end of said jump up lever 103 is to be engaged with the above mentioned mirror up and down signal slider 101 corresponding to the up and down movement of the mirror. 105 is a push up lever to transmit the up and down mirror movement and is axially supported rotatably around the axle 105b, while a pin 105a mounted on said lever 105 engages with the above mentioned jump up lever 103. 106 is a mirror receiving plate having a pin 106a and a spring 106b to bias the mirror receiving plate 106 downward. 107 is an intermediate lever engaging with the forward end part of the mirror driving lever 102 to rotate a leading screen release lever 32. 33' is a mirror charge lever. And as a conventionally known shutter button is released the checking lever 23 is rotated in the direction of arrow B' to release the engagement of the mirror driving lever 102. Then, the mirror driving lever 102 is rotated counter-clockwise by the spring 102a, and the jump up lever 103 rotates in the same direction integrally with the mirror checking claw 104. Thus, the pin 105a of the push up lever 105 rotates counter-clockwise to push the mirror receiving plate 106 upwardly. The forward end of the mirror jump up lever 103 pushes down the mirror up and down signal slider 101 in association with ascending action of the mirror to rotate the retaining lever 100 clockwise. Thus, the linked relationship between the sprocket 9 and the spool 11 is resumed and the above mentioned ordinary photographing state is resumed. Also the forward end of the mirror driving lever 102 rotates the intermediate lever 107 near the mirror ascending position to release the shutter checking of the above mentioned leading screen release lever 32 of the shutter release. As the gear 31 of the follower screen completion signal rotates in the direction of the arrow by running of the shutter leading screen and follower screen, the bent part 104b of the above mentioned mirror checking claw 104 is pushed out and moved up to disengage from the claw part of the lever 103, and the mirror returns to its descending position by the action of the descending spring 106b of the mirror receiving plate 106. As the jump up lever 103 rotates clockwise at this time, the mirror up and down signal slider 101 returns to its original position.

Next, at the time of ordinary photographing, the rewinding operation at completion of photographing can be effected by pushing the above mentioned button 14c up in the direction of arrow A as in multiple exposure photographing. While the claw part 12' of the gear 12 is checked by the spool checking lever 17 at the same time, when the sprocket 9 becomes free by action of the retaining lever (16, 100), since the claw part is shaped to slip in the rewinding direction (the direction reverse to the direction of arrow D of the spool), the spool 11 becomes rotatable in the rewinding direction, and thus rewinding can be achieved by a conventionally known rewinding operation.

As explained in detail, according to the present invention a camera allowing multiple exposure can be obtained such that multiple exposure photographing can be accomplished easily only by the pressing down of a button, and when the camera is set to the multiple exposure state by erroneous handling, etc., it can be easily released in association with a conventionally known type of manual stop down member or a mirror up member handled from outside of a camera. As a result, reliable operation can be assured with a simple structure.

While specific embodiments of the invention have been shown and described in detail to illustrate the application of the inventive principles, it will be understood that the invention may be embodied otherwise without departing from such principles.

What is claimed is:
1. A single lens reflex camera for multiple exposure photography including a shutter comprising:
   winding means for shutter cocking;
   film takeup means linked with said winding means;
   manually operable clutch means normally maintained in an engaged position;
   a film advancing sprocket linked with said film takeup means through said manually operable clutch means;
   operating means for manually operating said clutch means;
   displaceable retaining means adapted to be engaged with said operating means for retaining said clutch means in a disengaged position;
   shutter releasing means; and
   relieving means performing a reciprocating motion linked with said shutter releasing means; said relieving means actuating said retaining means in the advancing motion thereof to relieve said clutch means from said disengaged position to said engaged position prior to the opening function of the shutter.

2. A single lens reflex camera according to claim 1 including an automatic diaphragm member for actuating said relieving means.

3. A single lens reflex camera according to the claim 1 including a mirror actuating member having said relieving means linked thereto.

* * * * *